Nov. 3, 1964  B. BARÉNYI  3,155,421
MOTOR VEHICLE DOOR CONSTRUCTION
Filed Oct. 6, 1959  2 Sheets-Sheet 1
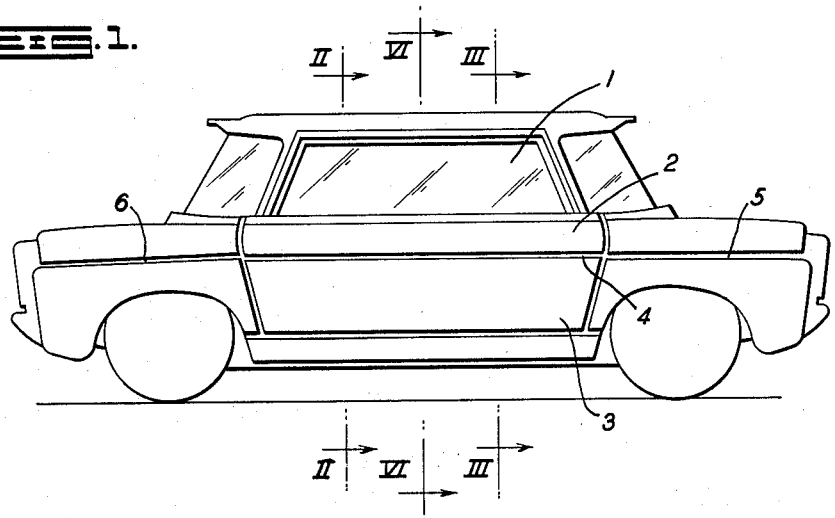
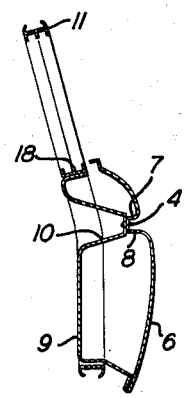
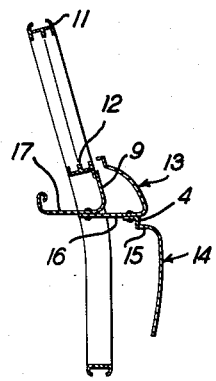
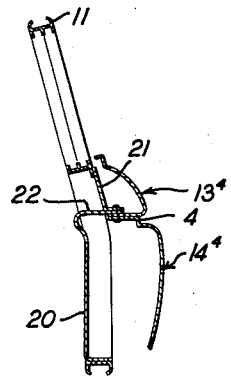
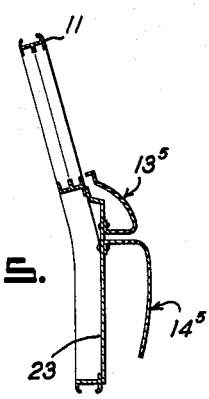
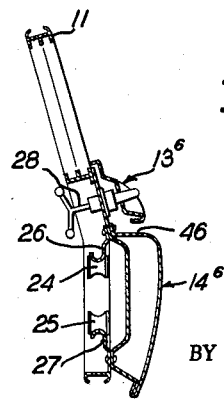
INVENTOR
BÉLA BARÉNYI
BY Dicke, Craig & Freudenberg
ATTORNEYS.

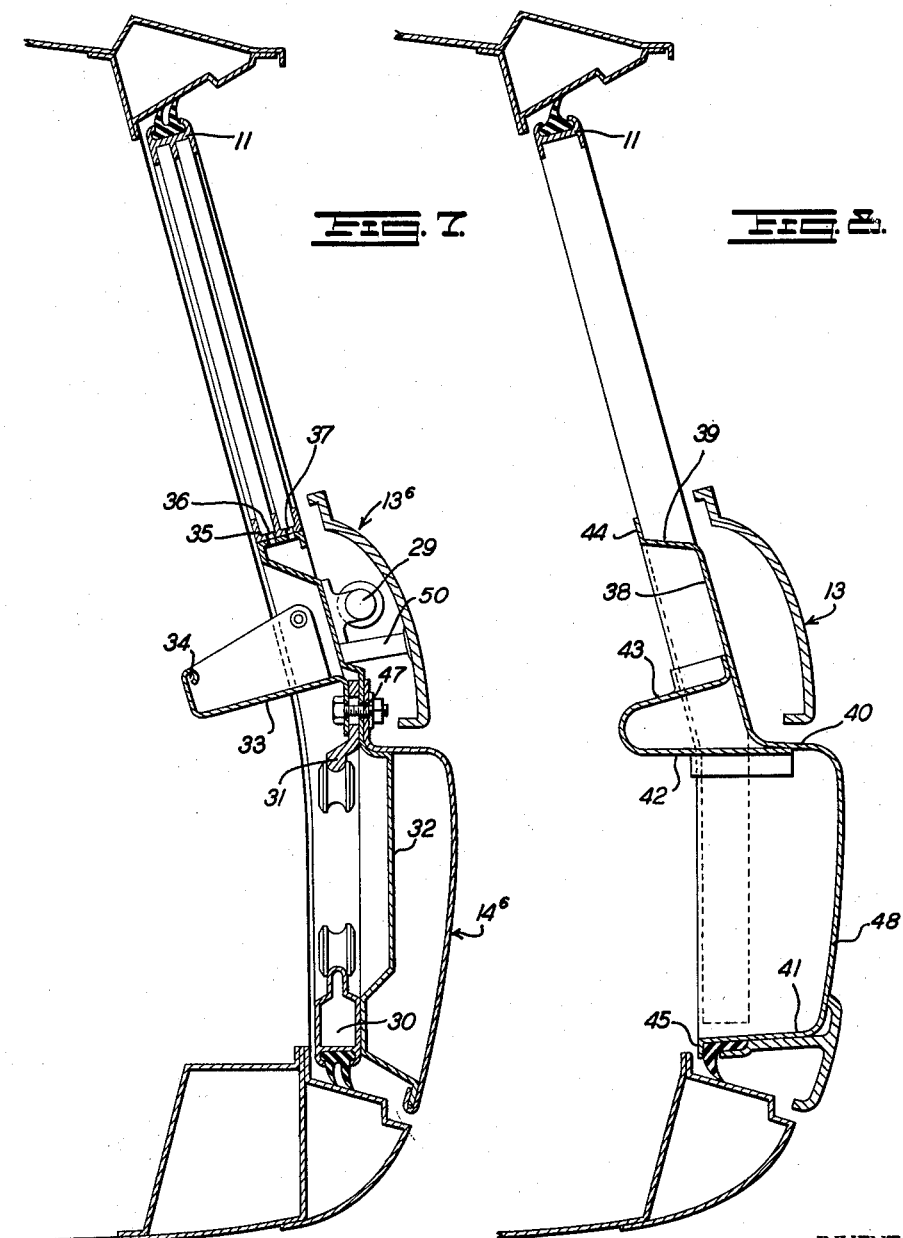

3,155,421
MOTOR VEHICLE DOOR CONSTRUCTION
Béla Barényi, Stuttgart-Vaihingen, Germany, assignor to Daimler-Benz Aktiengesellschaft, Stuttgart-Unterturkheim, Germany
Filed Oct. 6, 1959, Ser. No. 845,058
Claims priority, application Germany Oct. 8, 1958
6 Claims. (Cl. 296—47)

The present invention relates to a vehicle door, especially for passenger motor vehicles having a door frame provided approximately at half-height thereof with a longitudinal support member, and the outer body cover of which is subdivided into two horizontally extending superimposed sections.

The present invention is concerned with the problem of increasing to a considerable extent the rigidity of the shape and form in motor vehicle doors. For reasons of economy and in order to achieve as low a weight as possible of the over-all vehicle, the trend in modern motor vehicle construction more and more goes over to the utilization of relatively thin sheet metal members or plates for the inner and outer parts of the vehicle body. However, since such relatively thin sheet metal members do not offer any great resistance, the present invention seeks to increase by an appropriate shape of the sheet metal members the rigidity as to form and shape of the entire door. The present invention thereby points to an entirely new solution to this problem.

For purposes of solving the problems raised in connection with the present invention, it is proposed in accordance therewith to subdivide the outer body covering of the vehicle doors into two superposed, horizontally extending sections and to provide at the mutually facing boundaries of the two sections a channel or groove extending over the entire width of the door which is delimited or defined by at least one leg or arm portion extending into the channel or groove to such an extent that the securing means arranged at the leg or arm portions, such as bolts, screws, clamps, clips, welded seams, welded spots, welded beads and the like, are not visible from the outside of the vehicle.

A further advantage of the present invention resides in the fact that individual parts may be arranged in the groove- or channel-shaped recess which do not have to be constructed particularly advantageously as to appearance and ornamental design and which may, therefore, serve only the very purpose for which they are intended.

According to one embodiment of the present invention, it is proposed that the two sections of the door are formed by a single unitary part which is provided at the boundary of the two sections with a channel formed by a double-armed web portion and that the deepest place of the channel is connected with the door inner wall, with profile members, with spacer members or the like by any suitable means such as bolting, welding, spot-welding, gluing, cementing, bonding, clamping or the like.

On the other hand, it is also possible to provide a construction in accordance with the present invention in which the two sections disposed one above the other are made of different parts and that these two separate parts are bent inwardly at the mutually opposite edge portions by about 90° so that a channel is effectively formed thereby having two arm or leg portions. The arrangement may thereby be made in such a manner that of the two superposed parts forming the channel, the lower part is secured at the upper part and the upper part at the door inner wall in any suitable manner as by bolting, screwing, welding, spot-welding, gluing, cementing, bonding, clamping or the like. However, the two door parts disposed one above the other and forming the channel therebetween may also be secured together to the door inner wall by any suitable means, such as bolting, screwing, welding, spot-welding, cementing, gluing, bonding, clamping or the like. Furthermore, it is also possible to provide an arrangement in accordance with the present invention in which the two door parts disposed one above the other and forming the channel are individually secured in any suitable manner to the inner door wall, for instance, by means of welding, spot-welding, bolting, screwing, gluing, cementing, bonding or clamping or any other suitable manner.

The major part of the increased rigidity as to the shape of the door achieved in accordance with the present invention is due to the arm or leg portions of the channel-forming web-portion produced by the particular configuration of the door parts in accordance with the teachings of the present invention. The location of the leg or arm portions is thereby of particular importance.

Accordingly, it is proposed according to another feature of the present invention that at least one of the web or leg portions of the door construction in accordance with the present invention is disposed within the region of a longitudianl guide rail and/or of an arm rest and/or of a door handle. The door ordinarily is most heavily subjected to loads and forces within these regions which is particularly true of the longitudinal guide rail for slidable door constructions.

It is also of particular advantage if the closure mechanism and/or the locking mechanism of the door is disposed essentially in the center of the upper section of the door and more particularly on the outside, i.e., outside of the door inner wall and behind the upper outer door body section. In that manner, the locking mechanism is readily accessible after removal of the upper outer body part of the door formed by the aforementioned upper section thereof. This is of particular advantage in connection with the final assembly of the vehicle.

Normally, with the door constructions of the prior art, it involves great difficulties to adjust the door in relation to the closure and/or locking mechanism thereof. The door construction according to the present invention obviates this disadvantage by making possible, by the simple removal of the upper outer sheet-metal or plastic body member, to observe the two or more parts of the locking mechanism which engage with each other up to the final mutual engagement with each other. This advantage of the instant invention is of particular significance with slidable doors which are provided with a door closure mechanism utilizing several conical surfaces. By the use of an arrangement in accordance with the present invention, it is possible with such doors, after removal of the upper outer door section thereby laying bare the locking mechanism, to observe closely the interengagement of the two conical surfaces up to the end position thereof and to adjust the door correspondingly or subsequently readjust the door, if necessary.

For purposes of saving materials and to increase the rigidity of the door construction, the lower part of the inner door wall, together with the lower part of the outer body covering, may form a closed hollow body which is relatively rigid and resistant particularly to torsional stresses. Particularly, with inexpensive vehicles or with vehicles which are to be built with the least expenditures in materials, the present invention also provides the possibility that the upper half of the door inner wall and the lower half of the door outer wall form together a unitary, structural part which, by reason of the particular shape and configuration thereof and by the disposition of the cross-sectional profile of the common unitary structural part from the inside toward the outside, forms a particularly long, reinforced web portion in the center location thereof. The aforementioned unitary structural part which consists of the upper half of the door inner wall and of the lower half of the outer body door wall may be provided at least in parts of the upper, lower and/or lateral rims thereof with flange-like bent portions for purposes of securing thereat or abutment thereagainst of seals. Furthermore, an essentially U-shaped bent bearer may be arranged within the region of the center of the common structural part which is preferably secured at the web or arm portion of the outer body covering and at the upper inner door wall, and which forms, together with the unitary part, a hollow-body bearer member serving for purposes of further reinforcing the door construction. Additionally, the aforementioned hollow body bearer member may simultaneously serve as arm rest.

A particular advantage may be seen in connection with the present invention in the fact that the two sections of the door which are visible from the outside thereof and are disposed one above the other may be made of different materials, preferably the lower section of metal and the upper section of a synthetic plastic material. The upper door section or part may thereby be secured at the remaining parts of the door in a readily detachable manner, preferably by means of bolts, clamps, clips, snap fasteners, or the like, so that the aforementioned easy accessibility of the closure and locking mechanisms exist even to a greater extent.

A particular advantage may also be seen in connection with the construction utilizing the common unitary structural part in the fact that a single pressed member may be made by known deep drawing or deep rolling operations which entail economic advantages as to manufacture, ease of handling and quality of the finished product.

For purposes of assuring a completely satisfactory drainage of any rain water which may reach the lower edge of the window panes of the door according to the present invention, it is proposed in accordance with a further feature of the present invention that the portions of the door frame carrying the lower edge of the door window panes, of the window seal and of the parts of the door adjoining these parts below the same be provided with rain discharge or drainage apertures.

Accordingly, it is an object of the present invention to provide a door construction, particularly for passenger motor vehicles, which offers a particularly high rigidity, and effective resistance to any impacts or external forces impinging upon the vehicle door from the outside thereof.

Another object of the present invention is to provide a vehicle door construction which enables the use of relatively thin sheet-metal parts or parts made from other materials without sacrifice in the rigidity of the door, particularly as to the shape and configuration thereof.

Still another object of the present invention is the provision of a door construction, particularly for motor vehicle doors, which makes possible a relatively economic and inexpensive construction while at the same time assuring a relativley great rigidity and resistance to impacts for such door.

Still another object of the present invention is the provision of a door construction in which the various parts may be readily secured to each other without impairing the appearance of the vehicle yet requiring no special precautions or decorative means to cover up the places where the parts are secured to each other.

Still another object of the present invention is the provision of a door construction, particularly for sliding motor vehicle doors, in which simple connecting means for the various parts of the door may be effectively used without impairing the appearance of the outside of the vehicle.

Still another object of the present invention is the provision of a vehicle door construction which facilitates adjustment of both the closure and locking mechanism of the door.

A further object of the present invention is the provision of a door construction in which the parts are so subdivided that the final assembly of the vehicle including the final adjustments of the closure and locking mechanisms for the door may be readily made with great accuracy by the possibility of fully observing the entire closure and locking operation of the door.

A further object of the present invention is the provision of a motor vehicle door, particularly for passenger motor vehicles, which makes possible the use of different materials for different parts of the door so as to make best use of the economic and rigidity advantages derived from the use of different materials without impairing the possibility of readily assembling the various door parts without difficulties, and particularly without sacrifice to the rigidity and impact-resistance of the door.

These and other objects, features and advantages of the present invention will become more obvious from the following description when taken in connection with the accompanying drawing which shows, for purposes of illustration only, several embodiments in accordance with the present invention, and wherein:

FIGURE 1 is a schematic side-elevational view of a passenger motor vehicle provided with a door construction in accordance with the present invention which is constructed as a slidable door;

FIGURE 2 is a cross-sectional view through a first embodiment of a door according to the present invention, on a slightly larger scale than FIGURE 1 and taken essentially along line II—II thereof;

FIGURES 3 to 5 are cross-sectional views, similar to FIGURE 2, of three further embodiments of a door construction in accordance with the present invention all taken essentially in planes indicated in FIGURE 1 by the cross-sectional line III—III;

FIGURE 6 is a cross-sectional view through still another embodiment of a door construction in accordance with the present invention taken essentially in the plane indicated by line VI—VI of FIGURE 1;

FIGURE 7 is a cross-sectional view, on a larger scale, of the embodiment of FIGURE 6 with some minor modifications; and FIGURE 8 is a cross-sectional view, on an enlarged scale, similar to FIGURE 7, of still a further embodiment in accordance with the present invention.

Referring now to the drawing, wherein like reference numerals are used throughout the various views to designate corresponding parts, and more particularly to FIGURE 1, which illustrates a passenger motor vehicle generally illustrating the present invention, reference numeral 1 designates therein a slidable door for the vehicle which may be constructed according to any one of the specific embodiments of the present invention illustrated in FIGURES 2–8. Since FIGURE 1 only schematically indicates the outer appearance of the door construction in accordance with the present invention, it is obvious that the actual construction of the door may be as shown in detail in connection with any of the cross-sectional views of FIGURES 2 through 8 of the present invention. However, it is also understood that the particular constructions of FIGURES 2 through 5 and 8 may also be representative of cross-sectional views through doors of any other type of passenger motor vehicle, for example, of doors which are pivotally secured in hinges or hinge-like brackets having an essentially vertical hinge pivot.

The door 1 illustrated in FIGURE 1 consists essentially of two sections, namely an upper section 2 and a lower section 3. The mutual boundaries of the two sections 2 and 3 are realized by means of a channel designated in FIGURE 1 by reference numeral 4. The channel 4 is disposed approximately at half the height of the door 1 and is matched in height, position and shape to the channels, gaps or joints 5 and 6 of the rear and front vehicle body construction.

As illustrated in FIGURE 2, the two sections 2 and 3 may consist of a unitary sheet-metal member designated therein by reference numeral 6. The channel 4 is then formed by appropriately pressing or stamping the sheet metal part 6 inwardly at that particular location and is defined by two essentially horizontally disposed leg or arm portions 7 and 8 of the channel-forming web portion. The bottom portion of the channel 4 is secured in any suitable manner, for example, by bolting, clamping, or the like, so as to be detachable, or in the alternative by welding or spot-welding so as to be non-detachably secured thereto, with a bracket-like recessed portion 10 of the door inner wall 9 which extends outwardly of the inner door wall plane into proximity of the bottom portion of the channel 4. The bracket-like recessed portion 10 may also serve simultaneously as abutment surface or arm rest.

All of the embodiments of the door according to the present invention, as may be readily discerned from FIGURES 2 to 8, utilize in the basic construction thereof an essentially annularly shaped door frame 11 which has a particular cross-sectional profile. According to the present invention, an intermediate support or frame member 18 is arranged essentially in the center of the annular frame 11 which extends in the horizontal direction thereof, and which, on the one hand, carries the seals for the window panes and which, on the other, together with the lower part of the door frame, carries the inner and/or outer body parts of the vehicle door.

FIGURES 3 to 8 show different embodiments of vehicle door constructions in which the upper section and the lower section thereof are made of separate parts, each manufactured by itself. These separately manufactured parts are generally designated with reference numerals 13 and 14 whereby in FIGURES 3 to 8 reference numeral 13 generally designates the upper, outer body part and in FIGURES 3 to 7 reference numeral 14 designates the lower outer body part.

In the embodiment of FIGURE 3, the vehicle inner body wall 9' extends downwardly only to the height of the channel 4. The channel 4 in this embodiment is limited by two leg portions 15 and 16 whereby the leg portion 16 is constructed relatively wide and thereby increases in a corresponding measure the shape-rigidity of the entire door. The inner door wall 9' of the embodiment illustrated in FIGURE 3 is constructed essentially trough-like so that a support or abutment surface for the arm of the driver or passenger is produced thereby which is designated in FIGURE 3 by reference numeral 17. The inner wall 9' only covers the door toward the inside only in the upper region thereof.

In FIGURE 3, the lower outer body part 14 is connected with the upper outer part 13 in any suitable manner, illustrated only schematically in FIGURE 3, whereas the upper outer part 13 in turn is secured or connected with the door inner wall 9 in any suitable manner, again only indicated schematically in FIGURE 3.

In contradistinction thereto, in the embodiment of FIGURE 4, the lower outer body part $14^4$ and the upper outer body part $13^4$ are secured together with the lower and upper inner walls 20 and 21 of the door by means of common securing means of any suitable construction. In the embodiment of FIGURE 4, two separate partial inner walls 20 and 21 are provided of which the upper partial inner wall 21 is disposed slightly further outwardly so that also in the embodiment of FIGURE 4 an abutment or support surface 22 is obtained thereby.

In the embodiment according to FIGURE 5, the two outer body parts $13^5$ and $14^5$ are separate from each other and are separately secured in any suitable manner with the inner wall 23 of the door.

FIGURE 6 shows a cross-sectional view through the center of the vehicle and more particularly through a slidable door provided with a closure mechanism and with a guide rail and roller guide means for the entire door (not illustrated in FIGURE 1). In FIGURE 6, the guide roller members are designated by reference numerals 24 and 25 and the corresponding guide rails with reference numerals 26 and 27, respectively.

The closure mechanism is generally designated by reference numeral 28 and is preferably of the so-called bascule-type as illustrated, for example, in the German Patent 826,710, in the German Patent 1,031,177 and in the German Gebrauchsmuster 1,685,712 having conical complementary surfaces. The closure mechanism 28 and the entire locking linkage thereof are covered by the upper outer body part $13^6$ of the door.

FIGURE 7 illustrates, on a larger scale, a door construction of the type illustrated in FIGURE 6 with only minor changes. However, the cross-sectional view of FIGURE 7 is not taken through the center of the door as FIGURE 6, but slightly outside the center thereof so that only a part of the locking linkage 29 is visible below the upper outer body part $13^6$.

As may be readily seen from FIGURE 7, the lower guide rail 30 for the roller guide members 25, forms a portion of the lower horizontal section of the essentially annularly-shaped door frame 11. The upper guide rail 31 is detachably secured by means of a bolted connection 47 with the inner door wall 32 and with the lower outer body part 14. The upper outer body $13^6$ is secured to the inner door wall 32 at any convenient point in an easily removable manner by a conventional fastener means 50, such as a snap fastener-type connection or any other connection known to the art, which will provide for easy removal of the part $13^6$ permitting easy access to the locking linkage 29. The detachable connection of the upper guide rail 31 with the other parts of the door is so arranged and constructed that an adjustment of the guide rail 31 is feasible without any difficulty. Such an adjustment is necessary during installation or removal of the door. Simultaneously therewith, a support or abutment surface 33 is provided above the guide rail 31 which extends into the vehicle interior space and which may also serve as arm rest or as handle 34, for example, for closing the door.

In the intermediate horizontal frame member 35 of the door frame 11, which serves as support for the window panes, bores 36 and 37 are provided, as clearly shown in FIGURE 7, which are in communication with the corresponding bores provided in the door inner wall 32. The rain water which reaches the panes or between the panes of the window, may at first flow off along the outer side of the door inner wall 32 and thereafter along the outer side of the lower outer door body covering $14^6$. Such a construction provides a surprisingly simple solution for draining the rain water from the vehicle doors. In the vehicle door constructions of the prior art, the satisfactory drainage of the rain water always poses a difficult problem which could not be solved in a satisfactory manner. For the most part, only few bores could be arranged in the prior art door constructions for the drainage of the water which additionally had to be in communication with soldered tubes or pipes. These few bores and pipes, however, tend to clog up easily. In contradistinction thereto, the relatively large number of bores 36 and 37 possible in the embodiment according to FIGURE 7 of the present invention may be increased in any suitable manner since the part of the intermediate bearer member 35 which is utilized in connection therewith to locate therein the bores is subjected primarily to loads which are absorbed by the leg portions extending approximately perpendicularly therefrom.

FIGURE 8 shows a further construction and embodiment in accordance with the present invention of a vehicle door which distinguishes itself by a minimum requirement for materials in the construction thereof. As illustrated in FIGURE 8, the door utilizes a common structural part 38, 48 made of a single unitary member which forms in the upper section of the door, the inner door wall 38 and in the lower inner section of the door, the outer body wall 48 of the door. By the use of the relatively abnormally large leg portions 39, 40 and 41 there is achieved a relatively great sturdiness and rigidity of form and shape of the entire structural part 38, 48. This shape or form-rigidity is further enhanced by an essentially U-shaped bearer member 42, 43 which, together with the parts 38, 48 forms a hollow body member resistant or rigid to torsional stresses. For purposes of covering the door outwardly thereof in the upper half or section thereof, a separate upper outer vehicle body part 13⁶ is provided as in the preceding embodiments.

The U-shaped bearer member 42, 43 may be utilized in the region of the upper surface 43 thereof as an armrest or the like.

The common structural part 38, 48 of the embodiment as illustrated in FIGURE 8 is provided, at least in part, along the upper lower and lateral rim portions thereof with flange-like bent portions 44 and 45, whereby these bent portions 44 and 45 serve for purposes of suitably securing the unitary part 38, 48 to the other door parts as well as for accommodating thereat the seals.

While I have shown and described several embodiments in accordance with the present invention, it is understood that the same is not limited thereto, but is susceptible of many changes and modifications within the spirit and scope of the present invention, and I, therefore, do not wish to be limited to the particular embodiments described and illustrated herein, but intend to cover any changes and modifications as are encompassed by the scope of the appended claims.

I claim:

1. A motor vehicle door especially for passenger motor vehicles provided with a door frame, comprising inner door wall means, and outer body covering means for the door subdivided into two separate essentially horizontally extending sections disposed one above the other, said two separate sections each being provided at the mutually facing edges thereof with an angularly bent flange portion forming the leg portion for a channel extending over essentially the entire width of the door and between the upper and lower edges thereof, first securing means for effectively securing the lower one of said two sections to said inner door wall means, and second securing means for effectively securing the upper one of said two sections to said inner door in an easily removable manner independently of said first securing means, at least one of said first and second securing means including means securing a respective leg portion to said inner wall means, said respective leg portion extending into said channel to such an extent that said securing means arranged thereat for securing the same to said inner door wall means are essentially invisible from the outside of the vehicle.

2. A motor vehicle door as defined in claim 1, wherein said vehicle door includes an arm rest and wherein at least one leg portion is arranged within the area of said arm rest and is secured thereto.

3. A motor vehicle door according to claim 1, wherein said inner door wall means includes a lower part forming together with said lower section a closed hollow body member essentially rigid to torsional stresses.

4. A motor vehicle door as defined in claim 1, wherein the leg portion of said lower section terminates in an upwardly directed flange extending behind said upper section, and wherein said means securing a respective leg portion comprises means securing said upwardly directed flange to said inner wall means.

5. A motor vehicle door according to claim 4, wherein said vehicle has a slidable door provided with upper and lower longitudinal guide rails and wherein said respective leg portion is also arranged within the area of said upper guide rail.

6. A slidable motor vehicle door especially for passenger motor vehicles comprising a door frame including a lower guide rail and an intermediate horizontal frame member for supporting windowpanes, inner door wall means, an upper guide rail secured to said inner door wall means, roller means adapted to track along said guide rails and support the door, and outer body covering means for the door subdivided into two separate essentially horizontally extending sections disposed one above the other, said two separate sections each being provided at the mutually facing edges thereof with an angularly bent flange portion forming the leg portions for a channel extending over essentially the entire width of the door and between the upper and lower edges thereof, first securing means for securing the lower one of said two sections to said inner door wall means including an upwardly bent flange formed on the leg portion of said lower section and means for securing said upwardly bent flange to said inner door wall means behind said upper section and adjacent said upper guide rail, and second securing means for securing the upper one of said two sections to said inner door in an easily removable manner independently of said first securing means, said intermediate frame member and inner door wall means having drainage bores therein for rain water arranged to pass the water behind said upper section and to the front of said lower section, said leg portions extending into said channel to such an extent that said securing means arranged thereat for securing the same to said inner door wall means are essentially invisible from the outside of the vehicle.

References Cited in the file of this patent

UNITED STATES PATENTS

| | | |
|---|---|---|
| 1,274,872 | Gordon | Aug. 6, 1918 |
| 2,769,657 | Frie | Nov. 6, 1956 |
| 2,791,464 | Renno | May 7, 1957 |
| 2,797,953 | Barenyi | July 2, 1957 |

FOREIGN PATENTS

| | | |
|---|---|---|
| 521,078 | Italy | Mar. 25, 1955 |
| 1,140,005 | France | Feb. 25, 1957 |